(12) United States Patent  (10) Patent No.: US 8,435,104 B2
Dillon  (45) Date of Patent: May 7, 2013

(54) ARTICULATED COMBINE WITH UNLOADING AND REAR BOGEY STEERING ARCHITECTURE

(75) Inventor: Ben N. Dillon, Delaware, OH (US)

(73) Assignee: Tribine Industries LLC, Logansport, IN (US)

( * ) Notice: Subject to any disclaimer, the term of this patent is extended or adjusted under 35 U.S.C. 154(b) by 0 days.

(21) Appl. No.: 12/700,833

(22) Filed: Feb. 5, 2010

(65) Prior Publication Data

US 2010/0132324 A1    Jun. 3, 2010

Related U.S. Application Data

(62) Division of application No. 12/002,714, filed on Dec. 18, 2007.

(51) Int. Cl.
    *A01F 12/48*    (2006.01)
(52) U.S. Cl.
    USPC ............................................. 460/100
(58) Field of Classification Search ............ 460/23, 460/100
    See application file for complete search history.

(56) References Cited

U.S. PATENT DOCUMENTS

| | | | | |
|---|---|---|---|---|
| 1,509,403 | A * | 9/1924 | Emmett et al. | 56/14.6 |
| 1,771,359 | A * | 7/1930 | Taylor | 56/14.4 |
| 2,098,860 | A * | 11/1937 | Creech | 56/14.6 |
| 2,325,445 | A * | 7/1943 | Wagner | 414/657 |
| 2,749,696 | A * | 6/1956 | Innes | 56/10.3 |
| 4,428,182 | A * | 1/1984 | Allen et al. | 56/14.6 |
| 5,772,271 | A * | 6/1998 | Sanders | 296/32 |
| 2008/0146299 | A1* | 6/2008 | Matousek et al. | 460/100 |

\* cited by examiner

*Primary Examiner* — Alicia Torres
(74) *Attorney, Agent, or Firm* — Jerry K. Mueller, Jr.; Mueller Law, LLC

(57) ABSTRACT

An articulated harvester is composed of a forward bogey having an operator's cab, an engine, a grain harvesting assembly, a grain transfer assembly, but being devoid of an on-board grain bin. A rearward bogey is attached by a joint to the forward bogey and has a powered wheel assembly, an on-board grain bin for receiving grain from the forward bogey grain transfer assembly, and a grain off-loading assembly. The grain separating and cleaning assembly including a grain cleaning fan are located in front of the forward bogey axle and offset from the forward bogey centerline. The forward bogey transmission may be located ahead of or behind the forward bogey axle and offset opposite of the grain fan.

1 Claim, 24 Drawing Sheets

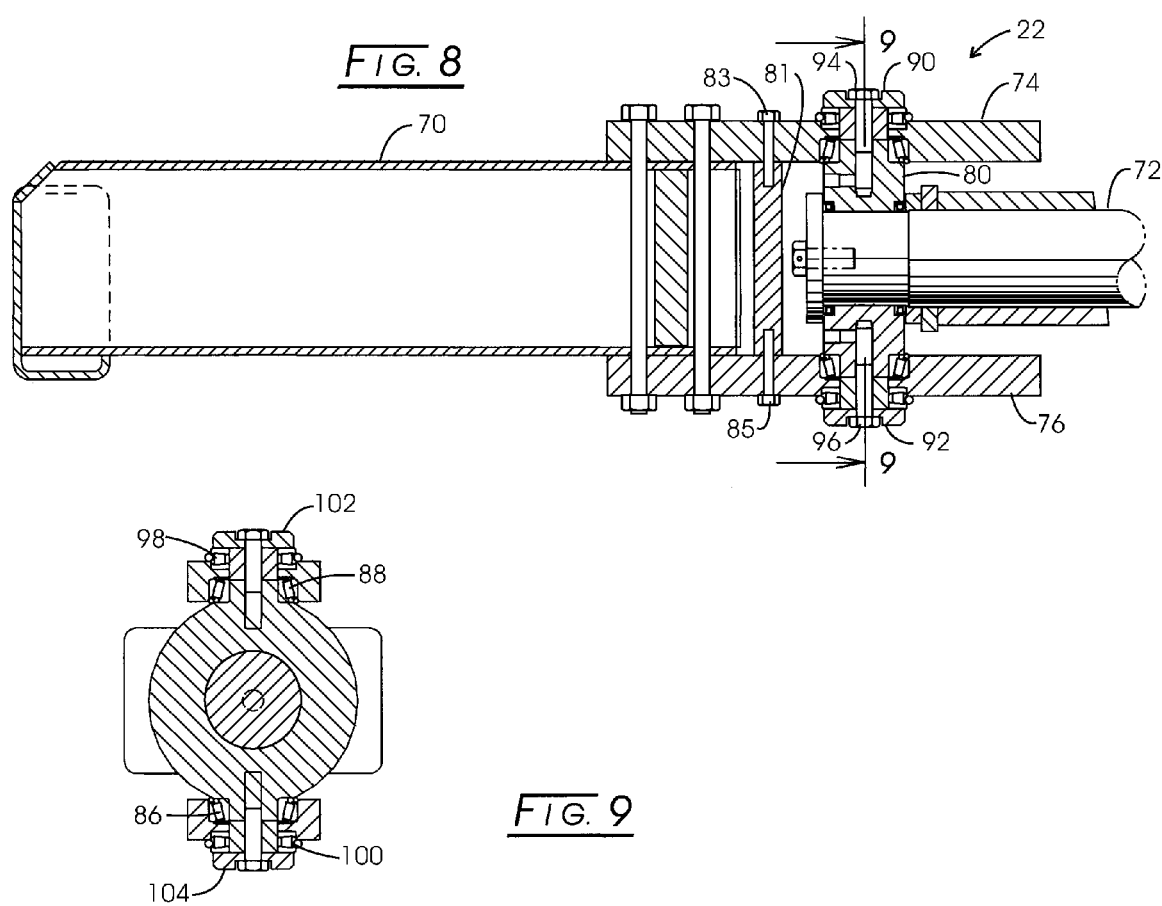

ARTICULATED COMBINE WITH UNLOADING AND REAR BOGEY STEERING ARCHITECTURE

CROSS-REFERENCE TO RELATED APPLICATIONS

This application is a division of U.S. patent application Ser. No. 12/002,714, filed Dec. 18, 2007, the disclosure of which are hereby incorporated by reference.

STATEMENT REGARDING FEDERALLY SPONSORED RESEARCH

Not applicable.

BACKGROUND

The present disclosure generally relates to grain harvesters (or combines) and more particularly to an articulated grain harvester.

The subject of an articulated harvester, some of which are based on current commercial grain harvester designs, is disclosed in U.S. Pat. Nos. 4,317,326, 4,428,182, 6,012,272, 6,125,618, 6,339,917, 6,604,351, 6,606,844, 6,604,995, 6,604,350, 6,484,485, 6,612,101, 6,233,911, 6,240,711, and 6,167,982. A harvester/grain cart combination can be converted to an "articulated" combine as disclosed in U.S. Pat. No. 6,910,845. Various grain handling and grain unloading techniques are disclosed in U.S. Pat. Nos. 7,143,863 and 7,198,449. The disclosures of these patents are expressly incorporated herein by reference.

Most of the articulated combines cited above exhibit compromised design features due to the design basis being limited to current commercial grain harvester designs. For example, current commercial grain harvester designs have an onboard grain bin with the forward bogey along with grain heads, cleaners, etc. That does not make such designs faulty, as they represent a substantial advancement in the harvester art for manufactures that want to maintain current grain harvester architecture.

A departure from the art is disclosed in U.S. Pat. No. 6,012,272, however, in that the forward bogey is devoid of an on-board grain bin, but carries the operator's cab, engine, grain harvesting assembly, and grain transfer assembly. The rear bogey has the on-board grain bin and steerable powered wheel assembly. U.S. Pat. No. 6,339,917 discloses a similar articulated combine where the forward bogey is devoid of an on-board grain bin, but carries the operator's cab, engine, grain harvesting assembly, and grain transfer assembly. The rear bogey has the on-board grain bin and a powered wheel assembly. Tracks, one wheel pair, and two wheel pairs, are illustrated for the harvester.

The presently disclosed articulated combine is based on a different steering philosophy for the rear bogey as well as for crabbing the rear bogey; on a different grain unloading philosophy; and other different philosophies, as disclosed herein.

BRIEF SUMMARY

Disclosed is an articulated harvester composed of a forward bogey having an operator's cab, an engine, a grain harvesting assembly, a grain transfer assembly, but being devoid of an on-board grain bin. A rearward bogey, optionally with an engine, is attached by a joint to the forward bogey and has a powered wheel assembly, an on-board grain bin for receiving grain from the forward bogey grain transfer assembly, and a grain off-loading assembly. The disclosed improvement includes the rearward bogey having a powered wheel assembly of a powered stiff axle wheel assembly pivotable for steering the articulated harvester when the joint has articulated by a defined number of degrees. The joint may be connected to the rearward bogey powered stiff axle wheel assembly by a beam that has a second joint disposed ahead of the stiff axle and actuatable to crab the articulated harvester for grain unloading.

Another aspect of the disclosed grain harvester is an improved grain off-loading assembly. The powered grain off-loading assembly is disposed at the bin rear for grain off-loading on either the harvester right side or the harvester left side.

A further aspect of the disclosed grain harvester is a grain bin having inwardly sloping sides and two rear corners formed by adjacent inwardly sloping sides. The powered grain off-loading assembly is disposed one of the bin rear corners and includes at least two pivotally connected grain chutes foldable from a storage position to an unloading position.

Yet another aspect of the disclosed grain harvester is a grain transfer assembly that includes a grain cleaning fan that is located in front of the forward bogey axle and offset from the forward bogey centerline.

Yet a further aspect of the disclosed grain harvester is a forward bogey wheel assembly that is powered by a first drive system, a rearward bogey wheel assembly that is powered by a second drive system. Each of the powered drive systems includes coordinated transmission and drive motors.

Yet a further aspect of the disclosed grain harvester is a powered grain off-loading assembly movable to unload grain on the right side and the left side of the harvester. The powered grain off-loading assembly terminates with a grain hood moveable about 180° to permit right side and left side grain unloading.

Yet a further aspect of the disclosed grain harvester is a horizontally disposed grain transfer chute terminated with a grain discharge end. The grain transfer chute rests atop a rotatable turntable assembly. The turntable assembly in turn rests upon a linear bearing assembly. A rail assembly carries the linear bearing assembly. The grain transfer chute, accordingly, can slide along and rotate about said rail assembly. The grain transfer chute can terminate with more than one grain discharge end. The chute also can have grain discharge ports disposed for discharging grain into said grain bin.

Advantages of the present apparatus include a rear bogey steering system requiring less power and composed of less expensive equipment. Another advantage is a grain unloading system adapted for grain unloading on both sides of the articulated combine. A further advantage is the ability for the grain-receiving vehicle (e.g., semi-truck or towed grain cart) operator to wirelessly control grain unloading, thus relieving the harvester operator of this operation so that the operator can concentrate on grain harvesting. These and other advantages will be readily apparent to those skilled in the art based on the disclosure set forth herein.

BRIEF DESCRIPTION OF THE DRAWINGS

For a fuller understanding of the nature and advantages of the present apparatus, reference should be had to the following detailed description taken in connection with the accompanying drawings, in which:

FIG. 8 is a sectional view taken along line 8-8 of FIG. 7;

FIG. 9 is a sectional view taken along line 9-9 of FIG. 8;

The drawings will be described in detail below.

DETAILED DESCRIPTION

Figure 1:
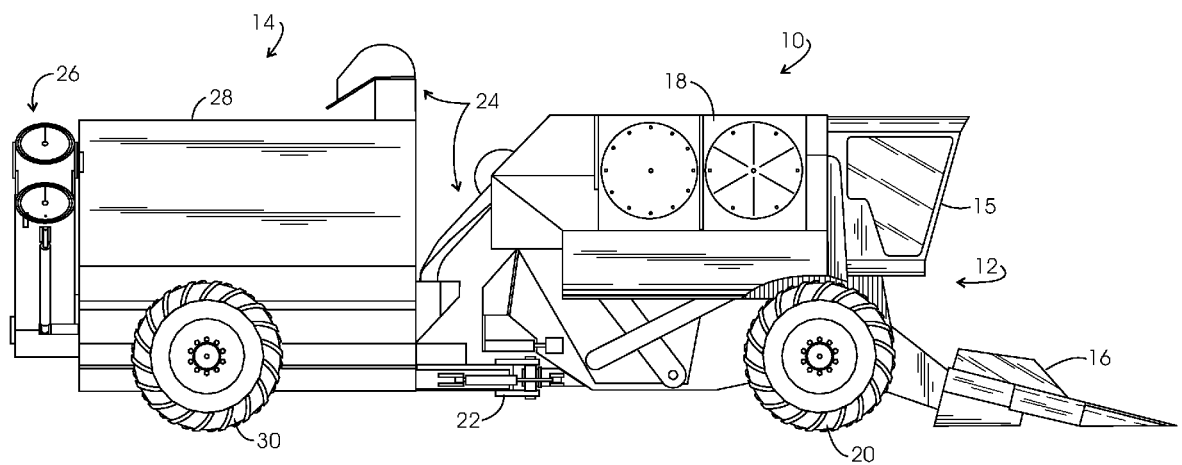
FIG. 1 is a side elevational view of the novel combine (or harvester)
Figure 2:
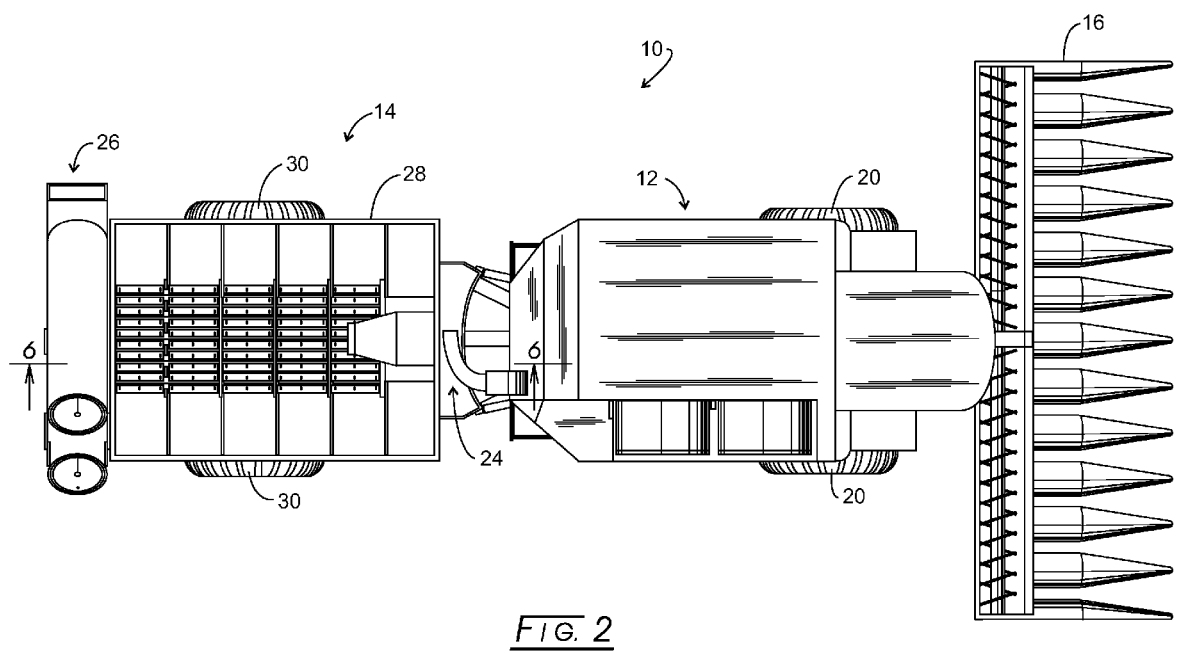
FIG. 2 is an overhead view of the harvester depicted in FIG. 1.

Referring initially to FIGS. 1 and 2, a combine, 10, generally includes a forward unit or bogey, 12, and a rearward unit or bogey, 14. Forward unit 12 is seen to include a cab, 15, in which the operator is seated, a cornhead or small grainhead, 16, an engine compartment, 18 (two cooling fan air inlets shown in the drawings), and a powered non-steerable wheel pair, 20. Rearward unit 14 is interconnected to forward unit 12 via a joint assembly, 22, and clean grain is transferred from forward unit 12 to rearward unit 14 via a clean grain transfer assembly, 24. Rearward unit 14 is seen to include a clean grain unloading assembly, 26, in its stored position. Finally, rearward bogey 14 carries a grain bin, 28, and is supported by a powered wheel pair, 30. Providing the grain bin capacity only on rearward unit 14 translates into a lower center of gravity for grain bin 28, which also enables higher storage capacity and provides more even weight distribution. Importantly, at about 1000-1200 bushel capacity of grain bin 28, combine 10 could harvest, for example, a cornfield for one mile before unloading. Capacity in excess of requirement means that harvester 10 can harvest for even greater distances before unloading.

Figure 3:
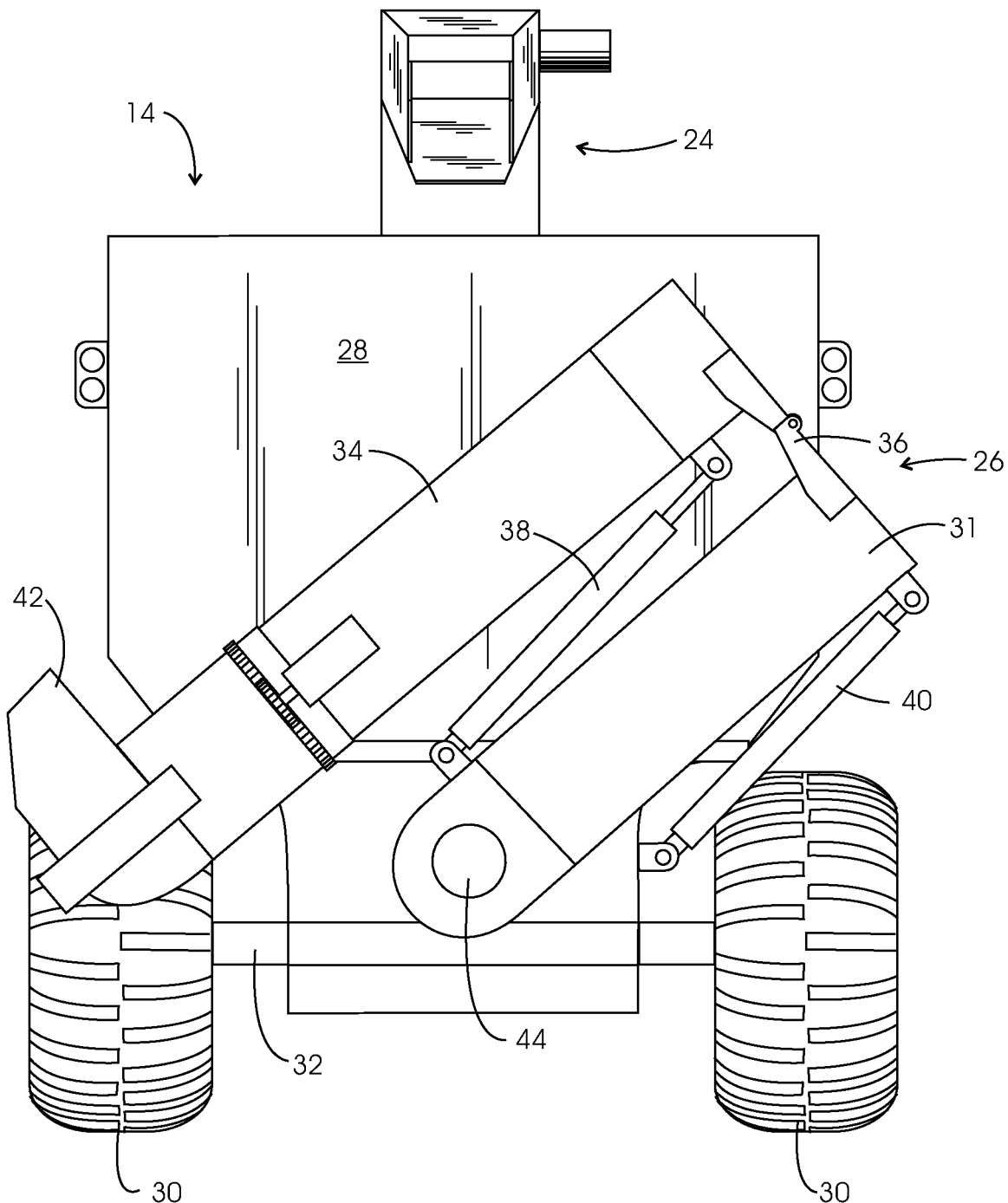
FIG. 3 is a rear view of the rear unit of the harvester depicted in FIG. 1 with the grain unloading assembly in a storage (inactive) position.
Figure 4:
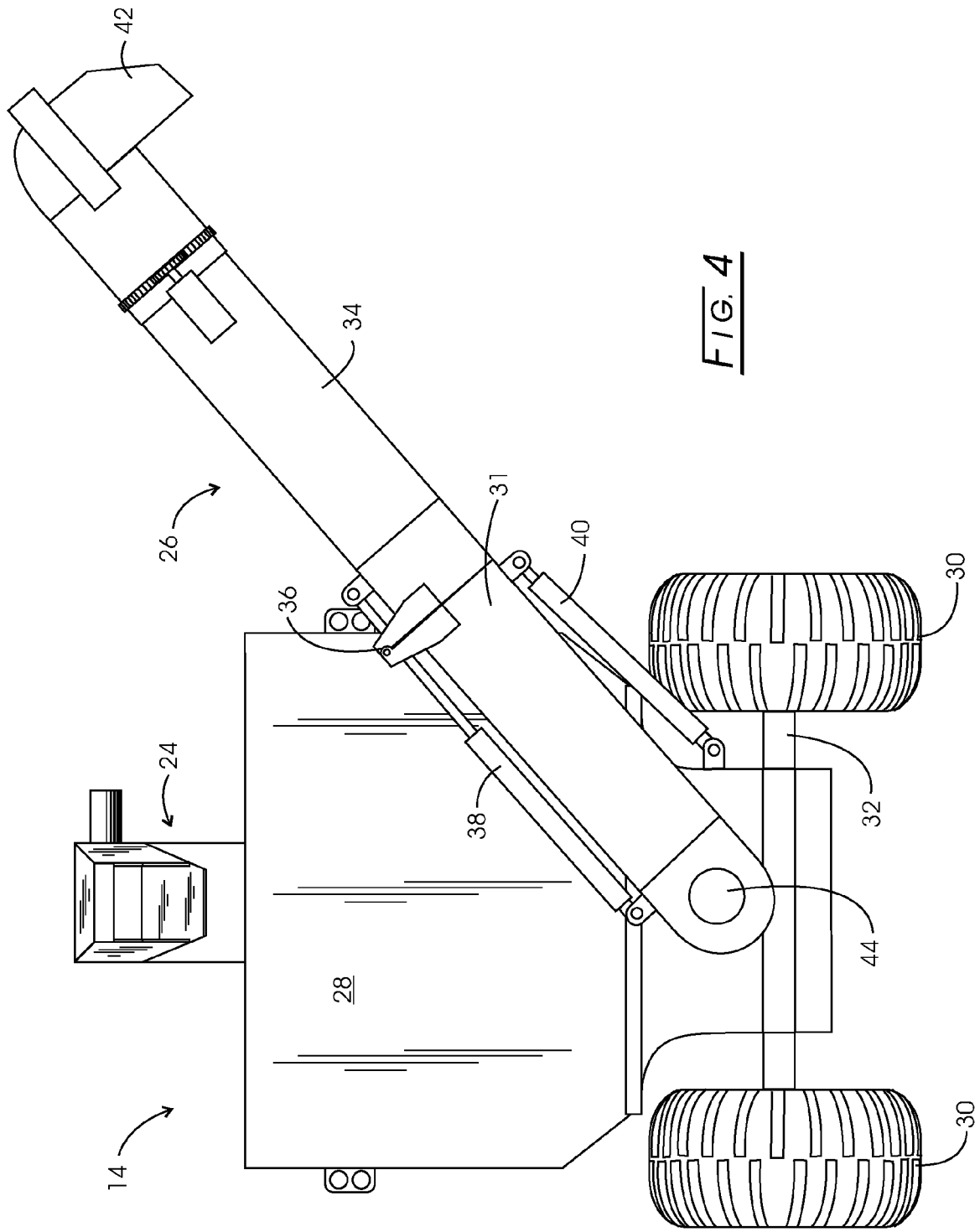
FIG. 4 is a rear view of the rear unit of the harvester depicted in FIG. 1 with the grain unloading assembly in an unloading (active) position on one side of the harvester.
Figure 5:
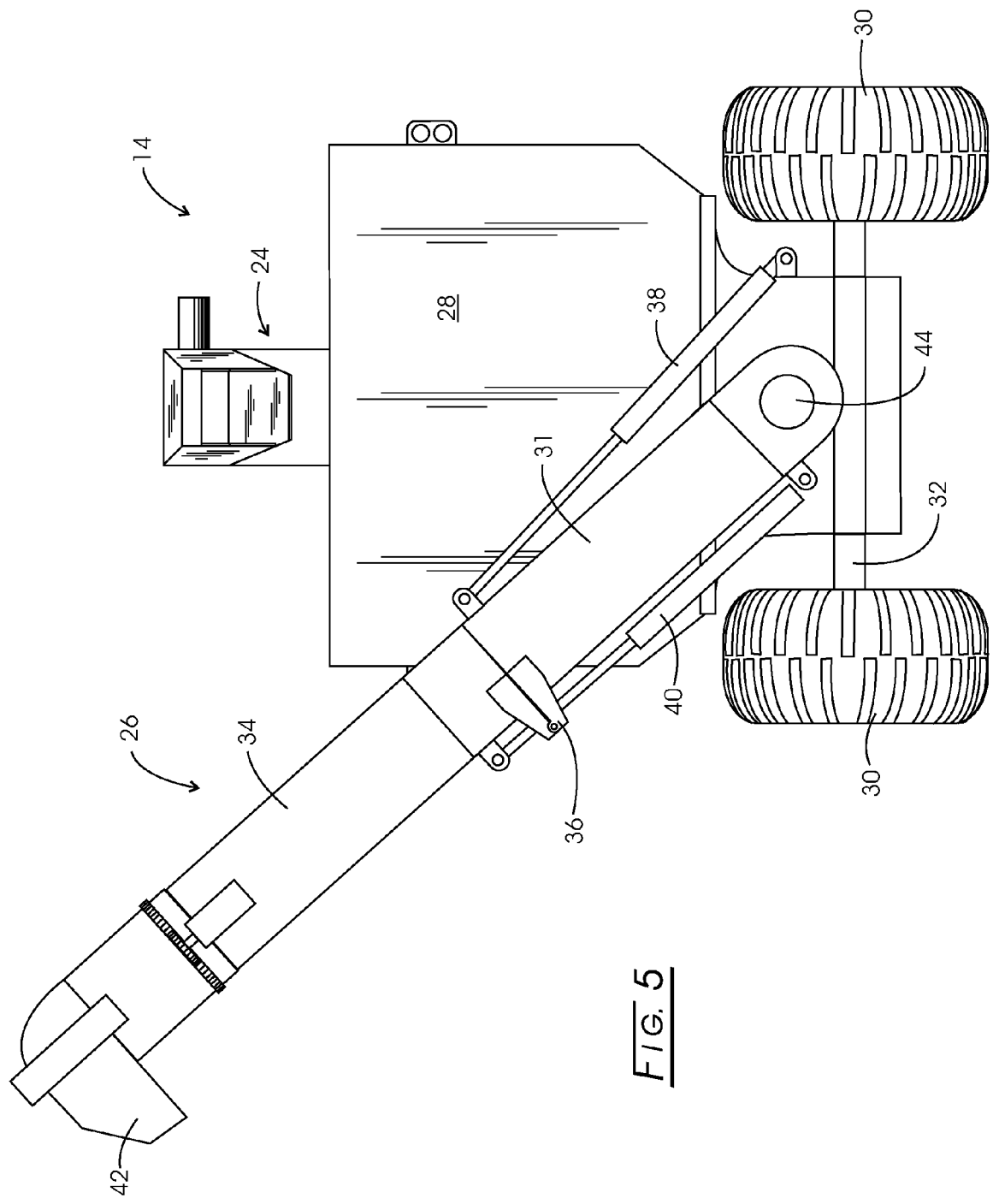
FIG. 5 is a rear view of the rear unit of the harvester depicted in FIG. 4 with the grain unloading assembly disposed on the other side of the harvester.

Referring to FIGS. 3, 4 and 5, wheel pair 30 is seen connected by a pivotable (see FIG. 7), stiff axle, 32. Clean grain unloading assembly 26 is seen carried at the rear of and by rear bogey 14. In particular, grain unloading assembly 26 is composed of a pair of chutes, 31 and 34, that fold/unfold about a pivot bracket, 36. In the stored position depicted in FIG. 3, chutes 31 and 34 have been disconnected and folded. In the unload (active) position depicted in FIG. 4, chutes 31 and 34 have been connected in grain transfer position by the rotation of chute 31 about pivot bracket 36. Pivoting is accomplished by a cylinder assembly, 38, connected to chute 34. A cylinder assembly, 40, connected to chute 31 positions unfolded grain unloading assembly 26 in the position needed for unloading clean grain in bin 28. A hood, 42, is disposed at the outlet of chute 34 for directing movement and location of the clean grain being unloaded. Hood 42 is rotatable about 180° to accommodate grain unloading on both sides of harvester 10.

Grain unloading assembly 26 is connected to rear bogey 14 by a pivot mount, 44. FIG. 5 shows grain unloading assembly 26 rotated about pivot mount 44 to the opposition side of rear bogey 14 for unloading grain on the other side of the harvester 10 by merely appropriate movement of cylinders 38 and 40. The novel grain unloading assembly, then, has the capability of unloading grain on either side of the harvester and of being folded into a compact storage position when not unloading clean grain.

Figure 6:
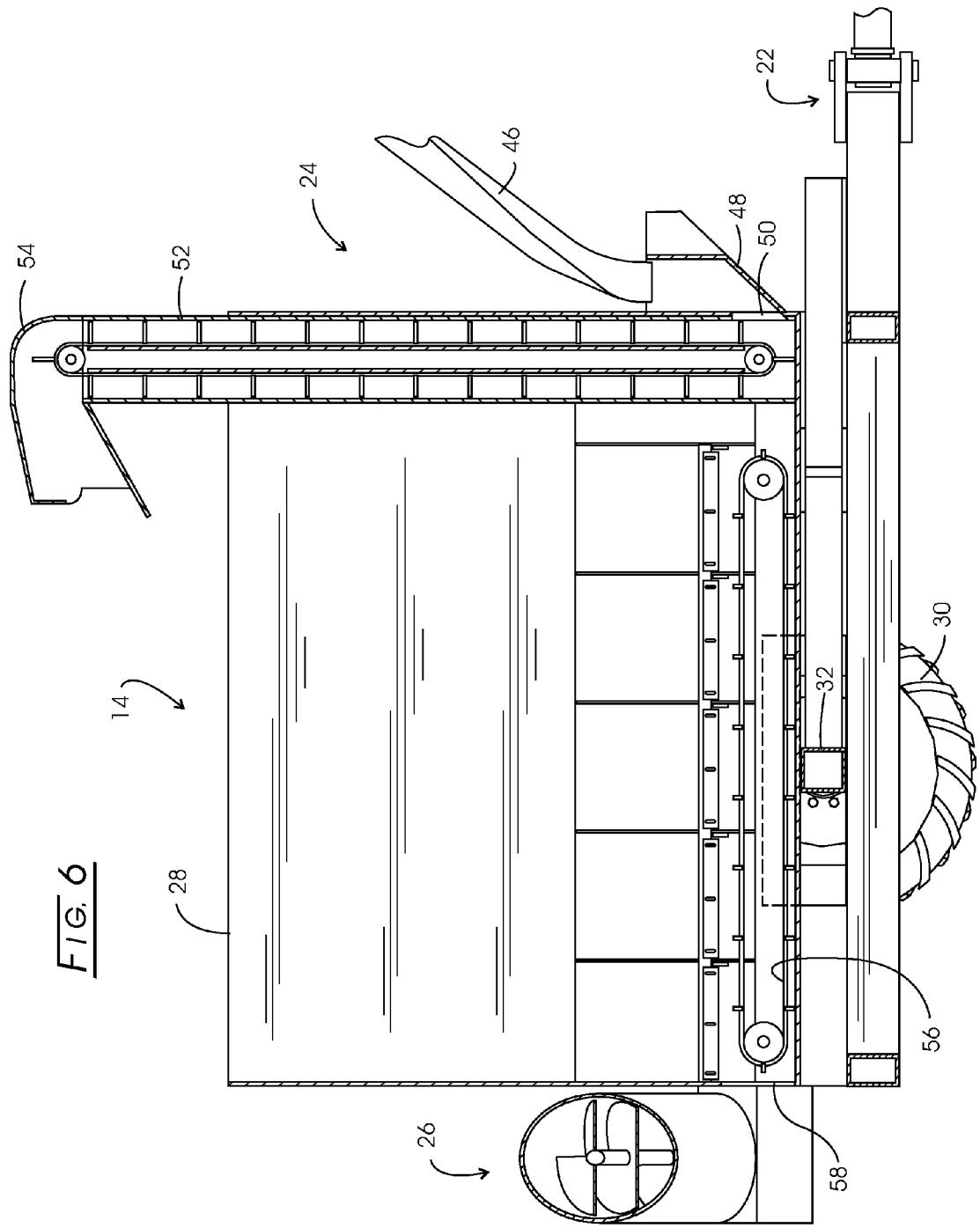
FIG. 6 is a sectional view taken along line 6-6 of FIG. 2 showing the rearward bogey.

The operation of forward bogey 12 essentially follows the description in U.S. Pat. Nos. 6,012,272 and 6,339,917. Transfer of clean grain from forward bogey 12 to grain bin 28 of rearward bogey 14 can be accomplished by a variety of designs. A currently available such clean grain transfer design is illustrated in FIG. 6. In particular, clean grain transfer assembly 24 commences with clean grain passing via the influence of gravity down a chute, 46, into a hopper, 48, carried by the lower front end of rear bogey 14. An opening, 50, in rear bogey 14 communicates between bin 48 and a grain elevator, 52, disposed inside the forward end of rear bogey 14.

Grain elevator 52 can utilize a variety of grain transfer mechanisms, such as for example, an auger, paddles, etc., and the particular grain transfer mechanism selected is unimportant. Illustrated in FIG. 6, is a paddle train transfer assembly that conveys clean grain upwardly through grain elevator 52 and out a hood, 54, and shoots the clean grain into bin 28.

Once the operator desires to unload clean grain from bin 28, the operator actuates a horizontal grain transfer assembly, 56, located in the bottom section of bin 28. Again, a paddled conveyor grain transfer assembly is illustrated for grain transfer assembly 56; although the skilled artisan will appreciate that an auger or other mechanism could be used with equal effectiveness. Grain transfer assembly 56 moves clean grain housed in bin 28 towards the rear of rear bogey 14, out an opening, 58, and into clean grain unloading assembly 26 for unloading of the clean grain.

Figure 7:
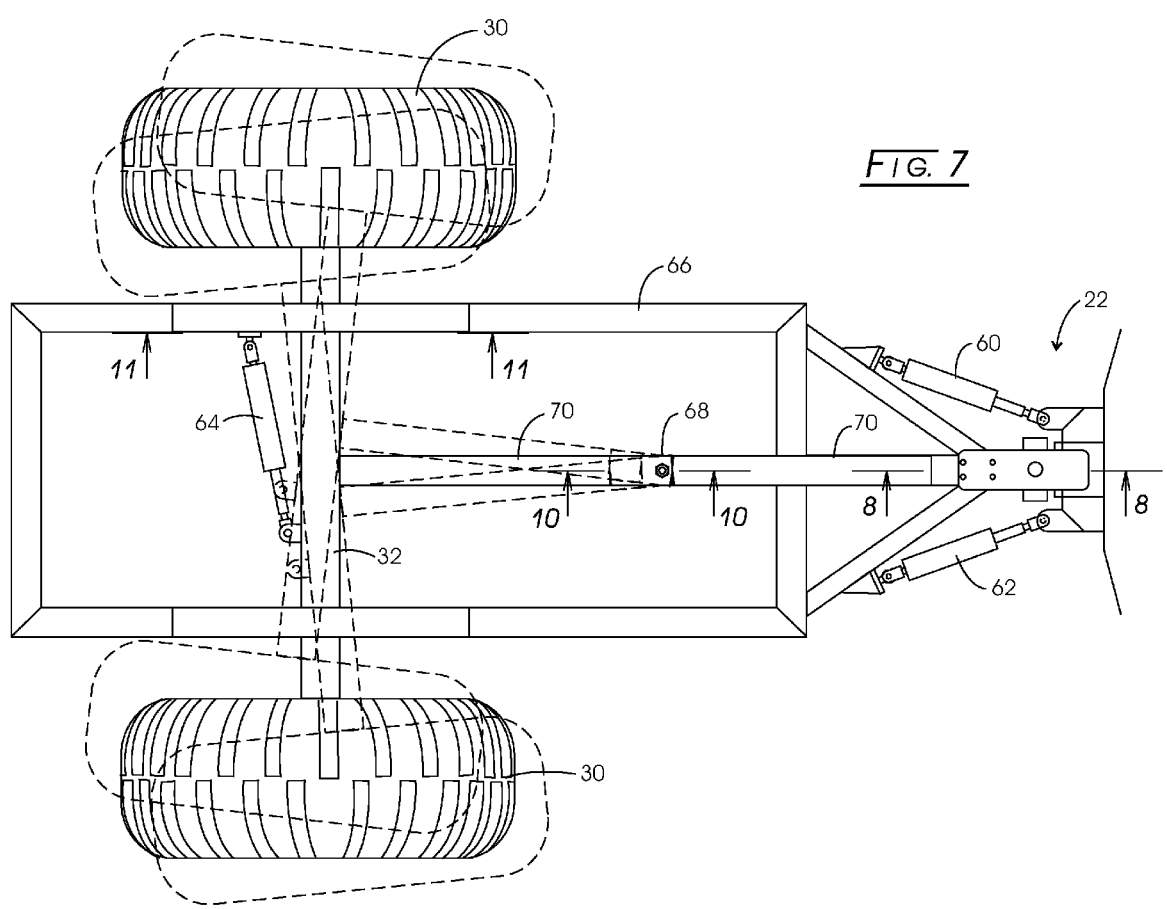
FIG. 7 is an overhead view of the rear bogey of the harvester of FIG. 1 showing the stiff axle pivoting as part of the steering system.

Turning of harvester 10 involves the use of joint assembly 22, which is fitted with a pair of a pair of steering cylinders, 60 and 62, as illustrated in FIG. 7. Such steering cylinders are conventionally used to assist in the steering of articulated vehicles and are provided here for such steering use in the present articulated combine design. Such steering cylinders are designed to provide about 38° turning of harvester 10. In order to add an extra about 12° of turning and in order to crab rear bogey 14, a supplemental steering assembly is provided.

The supplemental steering assembly is includes pivoting stiff axle 32 which is attached to one end a cylinder assembly, 64, which cylinder assembly is attached at its other end to a frame, 66, of rear bogey 14. Stiff axle 32 in turn pivots about another joint, 68, which is disposed about ten feet or so from stiff axle 32 in a beam, 70 that connects stiff axle 32 to joint assembly 22. Cylinder assemblies 60, 62, and 64 cooperate to provide full turning capacity for harvester 10 and crabbing of rear bogey 14, such as for unloading of clean grain from clean grain bin 28.

Harvester 10 is illustrated using the design of joint assembly 22 illustrated in FIGS. 8 and 9 of U.S. Pat. No. 6,339,917, the description therein being repeated here for certainty. Beam 70 is attached to rearward unit 14 at one end and is constructed as, for example, a round pipe or structural tube. A shaft, 72, extends from beam 70 towards forward unit 12 and is inserted into a bearing retainer assembly, 80, which is inserted between an upper frame member, 74, and a lower frame member, 76. These frame members 74 and 76 are bolted to forward unit 12 via bolts, not shown; although, other attachment means certainly can be envisioned. Each frame member 74 and 76 has an inner recess that confronts the corresponding recess in the other and into which is inserted bearing retainer assembly 80.

Bearing retainer assembly 80 has a pair of nibs or ears that fit into frame members 74 and 76 recesses and which ride on tapered roller bearings, 82a-82b to provide sideways movement to units 12 and 14 via frame 70. Such sideways movement aids in steering of combine 10. A hole penetrates through bearing retainer assembly 80 into which a reduced-diameter threaded end of shaft 72 fits and is secured. Now, thrust bearings, 86 and 88, fit into counterbores that adjoin the hole through bearing retainer assembly 80 and which thrust bearings permit shaft 72 to rotate and which, thus, enables units 12 and 14 to rotate with respect to each other. Such rotation permits units 12 and 14 to traverse uneven terrain during harvesting or other movement of combine 10. Note, however, that beam 70 and shaft 72 are not permitted to move in a vertical direction due to the construction of joint assembly 22. It should be understood that the connection of joint 22 could be the reverse of that connection depicted in FIGS. 8 and 9. That is, beam 70 could be attached to forward unit 12 rather than rearward unit 14.

Additional thrust bearings have been added to take up the additional separational forces that joint 22 sees due to taped roller bearings 86 and 88. Frame members 74 and 76 are removably attached to beam 70 that is connected to rear unit 14. Additionally, spacers, 81, are held in place by threaded bolts, 83 and 85, which fit through holes in frame members 74 and 76, respectively. Frame members 74/76 also have apertures into which flanged plug assemblies, 90 and 92, are placed and held securely by threaded members, 94 and 96, respectively. Recesses adjacent the apertures in frame members 74/76 contain races into which thrust bearings, 98 and 100, respectively fit and are retained by the flared heads of flanged plugs 102 and 104. Flanged plug assemblies 102 and 104 include spacers (not shown in the drawings) to ensure that tapered roller bearings 86 and 88 are not excessively preloaded when flanged plugs 102 and 104 are tightened and washers (not shown in the drawings) are provided for the flanges of plugs 86 and 88 to bear against when tightened. While joint 22 is illustrated as being about 6" in height in FIGS. 8 and 9, a 12" high joint assembly may absorb and withstand the expected forces placed on joint 22.

Figure 10:
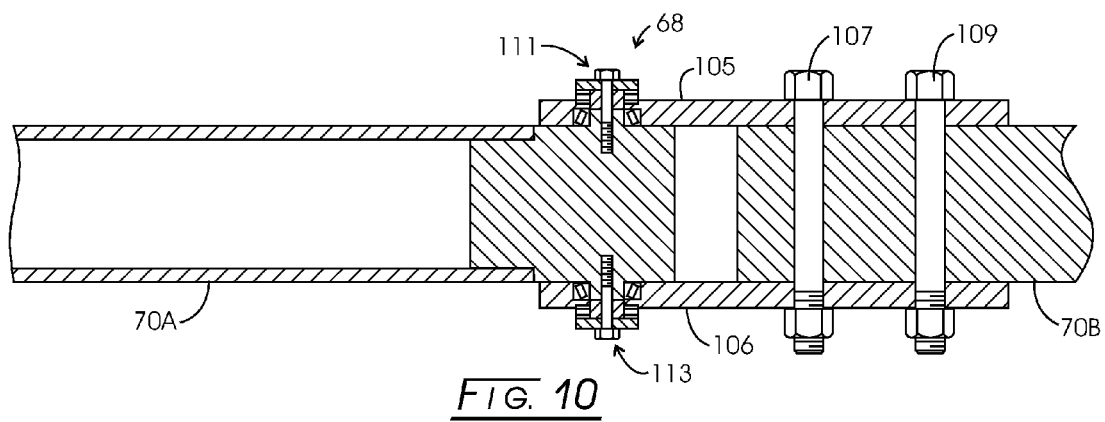
FIG. 10 is a sectional view taken along line 10-10 of FIG. 7.
Figure 11:
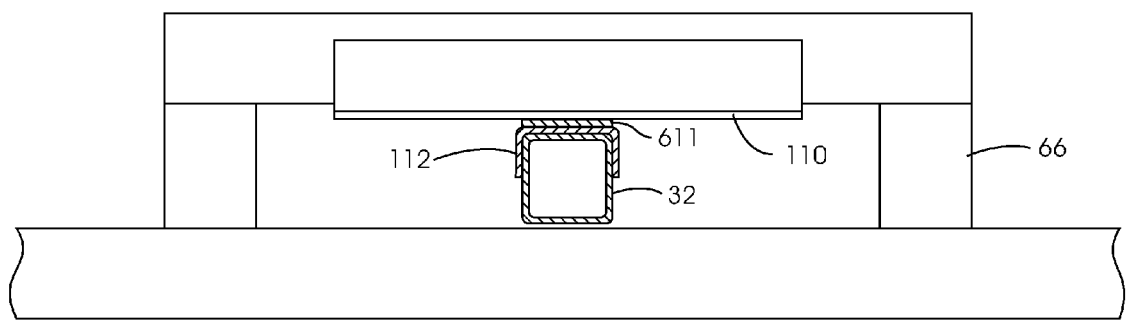
FIG. 11 is a sectional view taken along line 11-11 of FIG. 7.

In FIG. 10, beam 70, composed of a beam section, 70A, and a beam section, 70B, is seen interrupted by pivot joint 68. Beam section 70B carries a pair of plates, 105 and 106, which is held in place by a pair of bolt assemblies, 107 and 109. Beam section 70A in held to plates 105 and 106 by a pair of roller bearing assemblies, 111, and 113, which permit beam section 70A to rotate with respect to beam section 70B. It should be noted that plates 105 and 106 restrain vertical movement between beams 70A and 70B. Other joint assemblies, of course, could be used. In FIG. 11, frame 66 is shown along with a turntable, 110, and an interposed low friction material pad, 611, supporting stiff axle 32. Movement of stiff axle 32, then, results in movement of beam section 70A about pivot 68.

Figure 12:
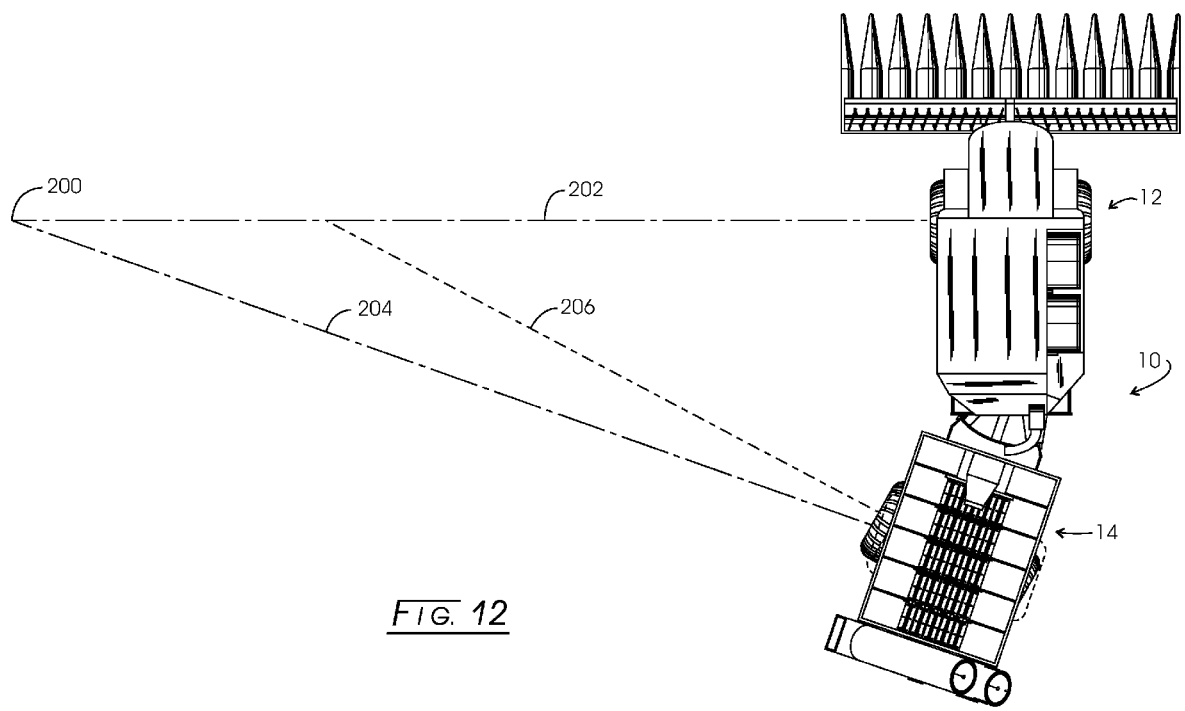
FIG. 12 is a simplified overhead schematic of the turning geometry for the rear bogey of the harvester of FIG. 1.
Figure 13:
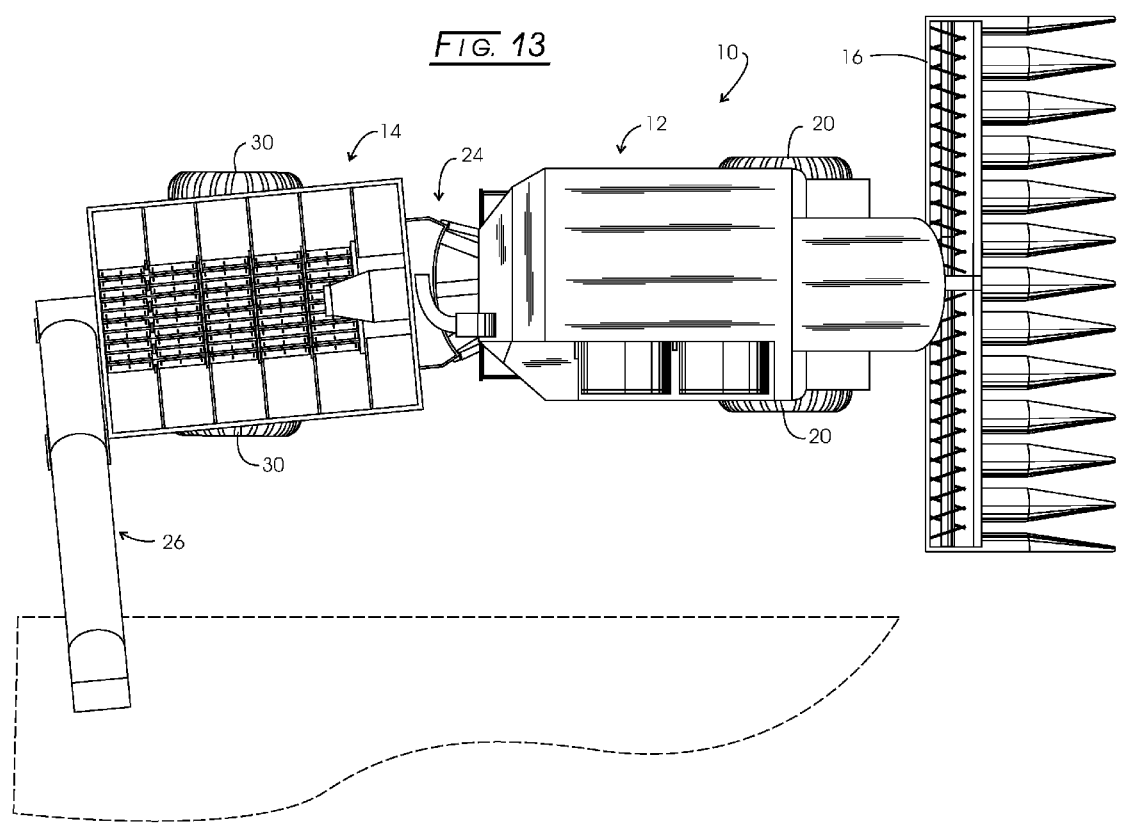
FIG. 13 is an overhead view of the harvester depicted in FIG. 1 with the grain unloading assembly in the position depicted in FIG. 4 and unloading grain into a grain bin, such as carried by a typical road semi-trailer.
Figure 14:
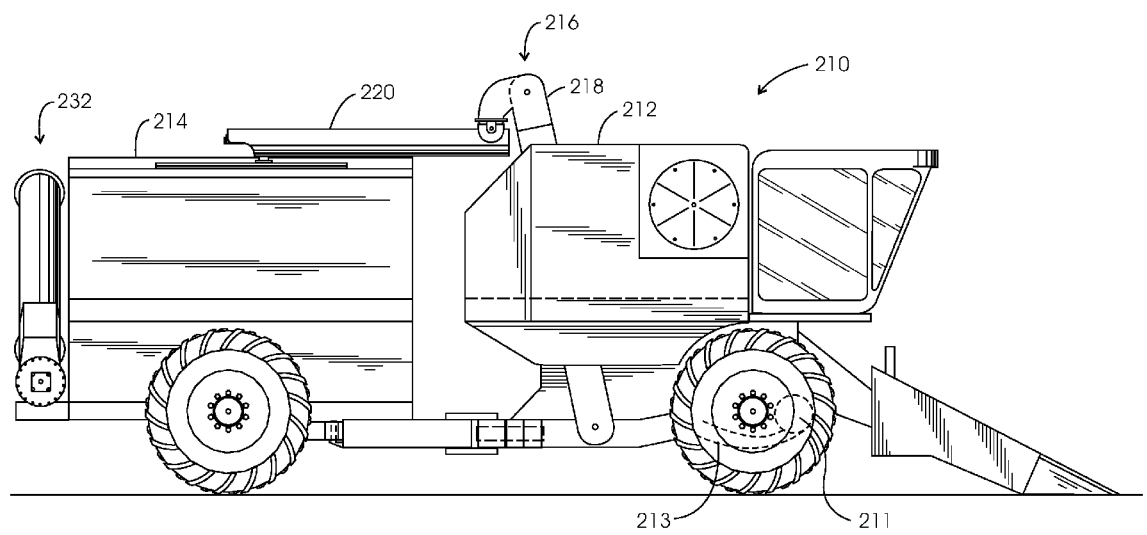
FIG. 14 is a side elevational view of the novel combine (or harvester) showing an alternative a grain transfer assembly from the forward bogey to the rearward bogey and a new forward bogey design.
Figure 15:
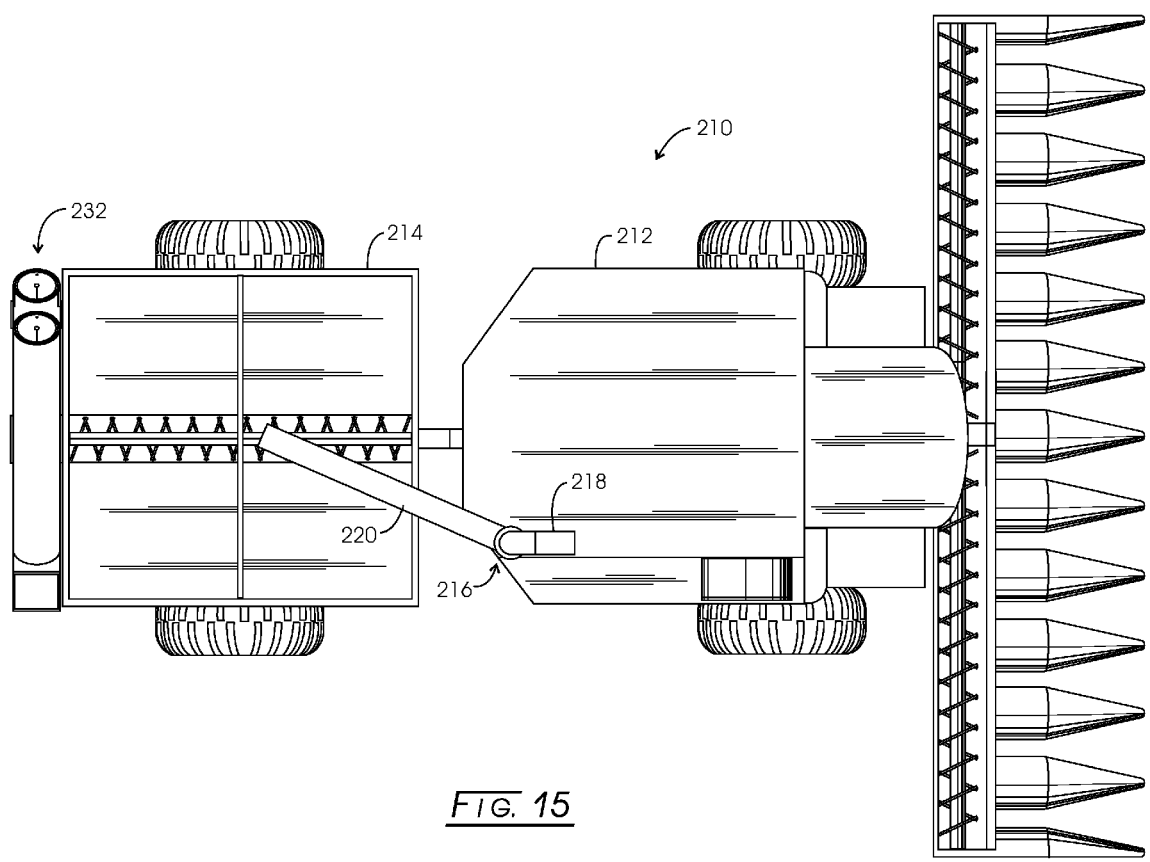
FIG. 15 is an overhead view of the harvester depicted in FIG. 14.

Turning of harvester 10 by the combination of articulation cylinders assemblies 60 and 62, coupled with pivoting of stiff axle 32 about pivot 68, is illustrated in FIG. 12, where a simplified overhead view of harvester 10 is illustrated. The center of turning is a point 200. The radius for wheel pair 20 for forward bogey 12 is radius 202. As illustrated in FIG. 12, articulation cylinders 60 and 62 have been rotated to their maximum extent of, say about 38°. During this initial turn, the radius of wheel pair 30 of rear bogey 14 is radius, 204. At that time, cylinder assembly 64 is extended to pivot stiff axle 32 about pivot joint assembly 68, which changes the radius of wheel pair 30 to radius 206. Another, say, about 10° of turn has been added to harvester 10. For crabbing rearward bogey 14, the operator need only actuate cylinder assembly 32, while continuing to drive forward bogey 12 in a straight line, such as is illustrated in FIG. 13.

With reference to FIGS. 14-27, two important new features are illustrated. These features are different than for the harvester described in FIGS. 1-13. One of these features is the grain transfer assembly that transfers grain from the forward bogey to the rear bogey. The second feature is the redesigned forward bogey making it about 4 feet shorter than current commercial harvesters and than the forward bogey design in FIGS. 1-13.

Turning to the alternative grain transfer assembly embodiment and FIGS. 14, 15, 19, and 20, an articulated harvester, 210, is composed of a forward bogey, 212, and a rear bogey, 214. Rear bogey 214 nominally is the same as bogey 14 described above, but for the difference that will be set forth below. In particular, a grain transfer assembly, 216, is composed of a generally vertical transfer section, 218, carried by forward bogey 212 and a generally horizontal transfer section, 220 carried by rearward bogey 214. Together, grain transfer sections 218 and 220 transfer clean grain from forward bogey 212 into the grain cart assembly of rearward bogey 214.

Figure 16:
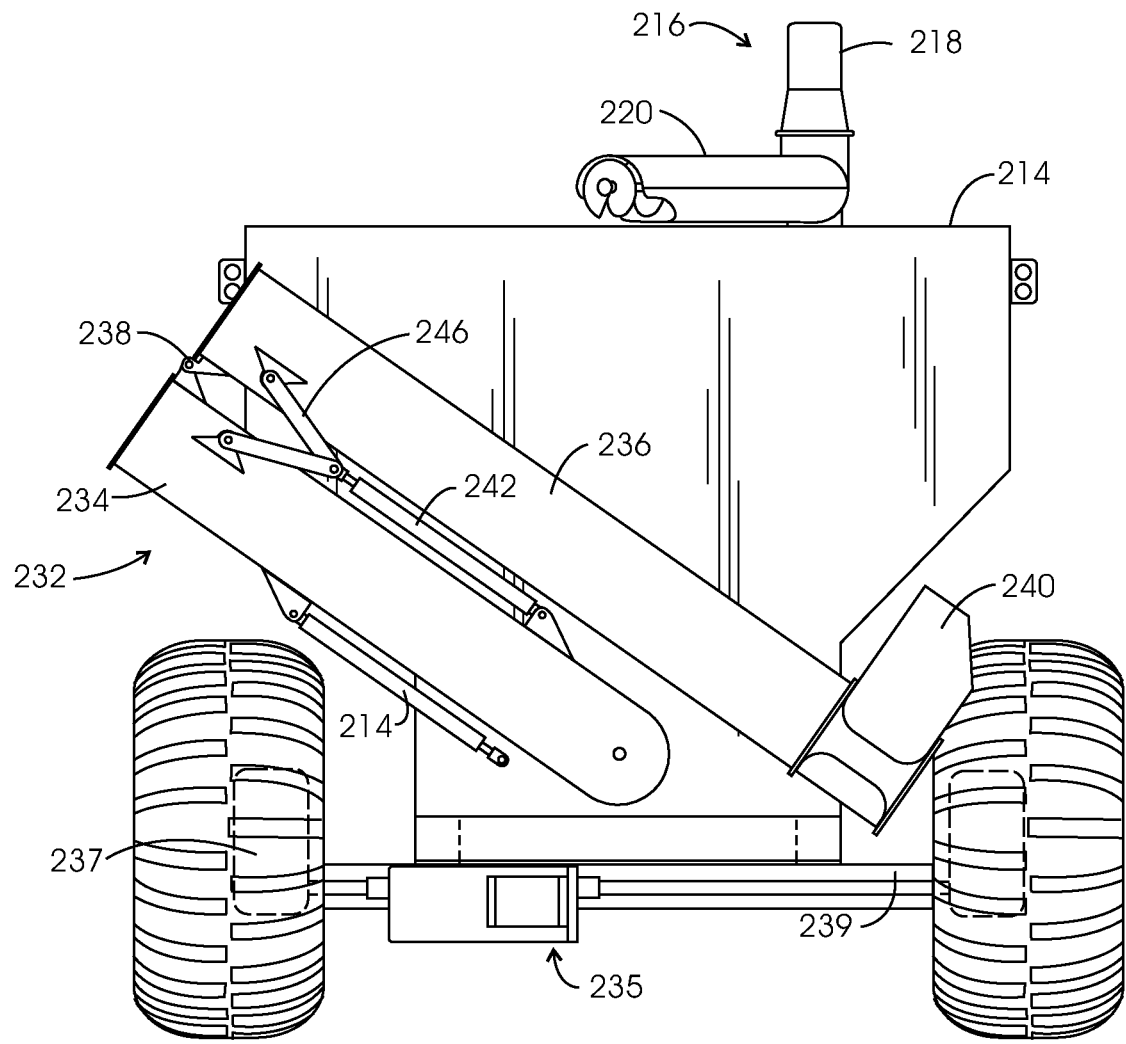
FIG. 16 is a rear view of the rear unit (bogey) of the harvester depicted in FIG. 14 with the grain unloading assembly in a storage (inactive) position.
Figure 17:
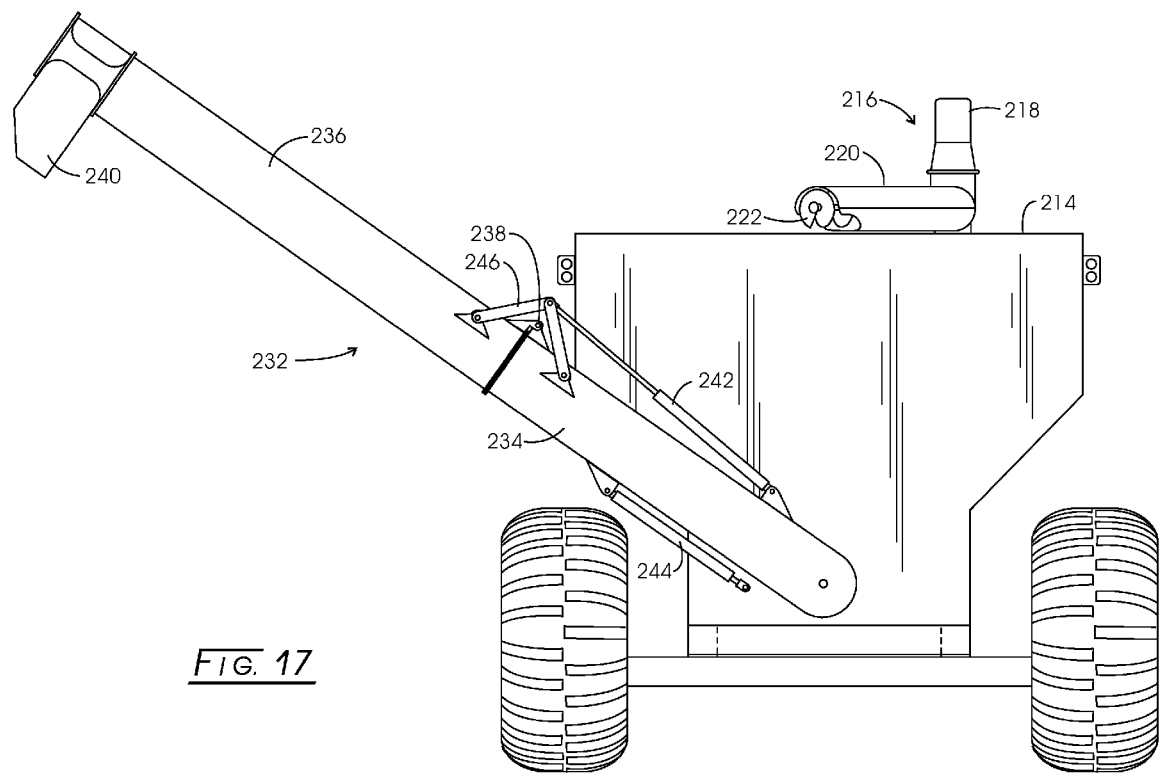
FIG. 17 is a rear view of the rear unit (bogey) of the harvester depicted in FIG. 14 with the grain unloading assembly in an unloading (active) position.
Figure 18:
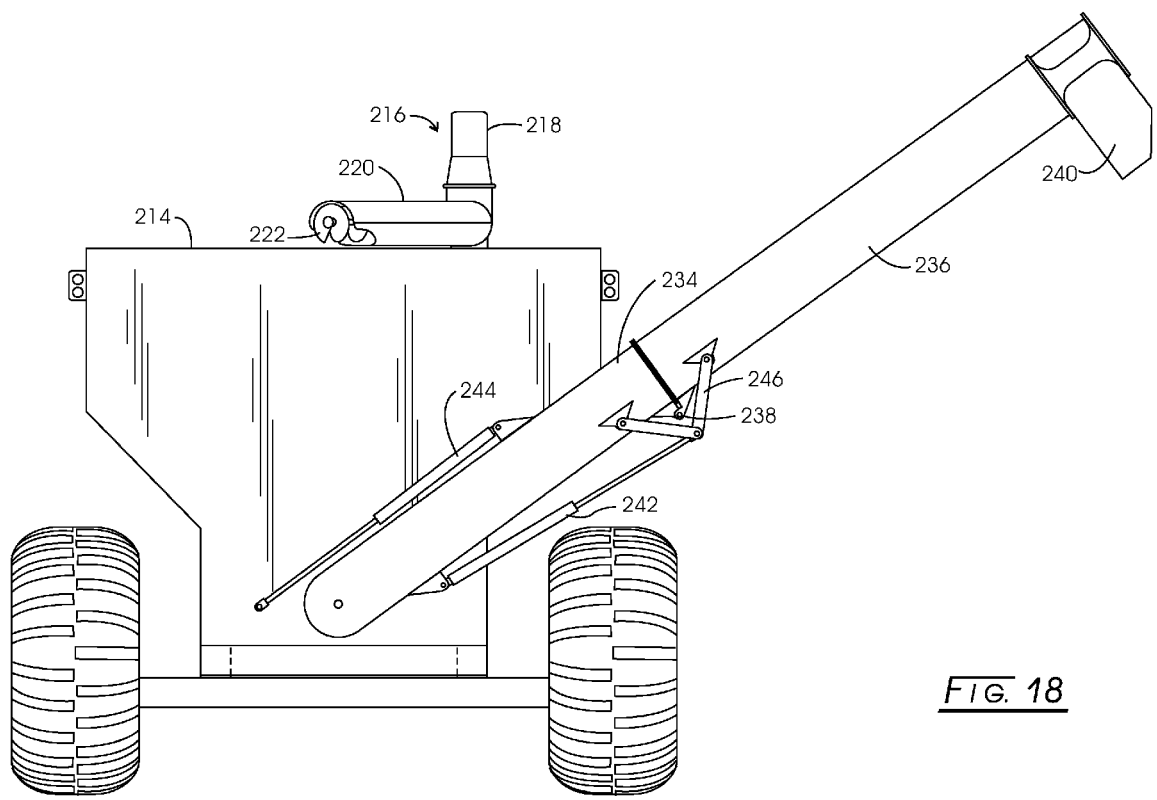
FIG. 18 is a rear view of the rear unit of the harvester depicted in FIG. 17 with the grain unloading assembly disposed on the other side of the harvester.

In particular, generally vertical transfer section 218 can be an auger assembly, enclosed paddle conveyer, or any other grain transfer assembly that is able to vertically transfer clean grain. Generally horizontal transfer section 220 can be an auger assembly, enclosed paddle conveyer, or any other grain transfer assembly that is able to horizontally transfer clean grain. FIG. 16 depicts an enclosed auger assembly, 222, as the grain transfer device for generally horizontal section 220.

Figure 19:
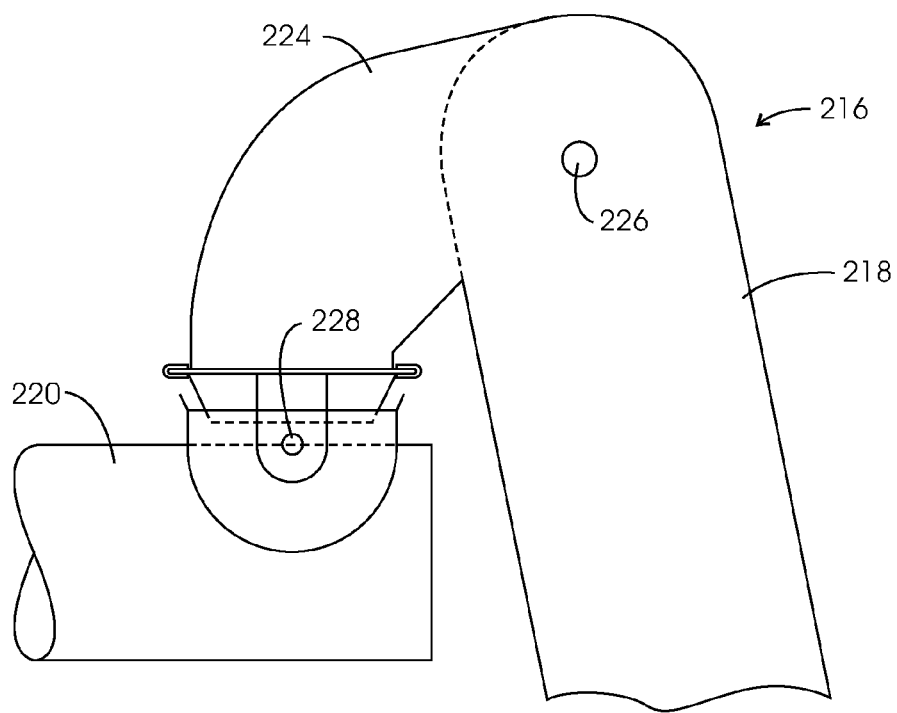
FIG. 19 is an enlarged view of the alternative a grain transfer assembly of FIGS. 14 and 15 at the forward bogey.

A joint assembly, 224, connects sections 218 and 220, as seen in FIG. 19. Joint assembly 224 is pivotally connected to upstanding section 218 by a pivot connection, 226, which permits horizontal section 220 to move up and down, such as by the rear bogey moving over uneven ground. Joint assembly 224 is connected to horizontal section 220 by another pivot connection, 228, which permits horizontal section 220 to move laterally (side-to-side), such as when rear bogey 214 is crabbed. Together joint connections 228 and 228 permit relative movement of sections 218 and 220 in the pitch axis and in the yaw axis.

Figure 20:
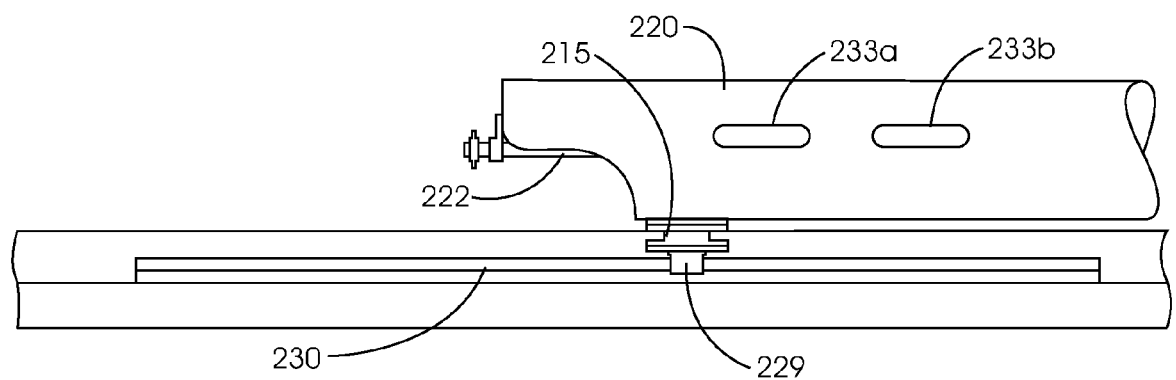
FIG. 20 is an enlarged view of the alternative a grain transfer assembly of FIGS. 14 and 15 showing the rail system for support of the horizontal conveyor segment of such alternative grain transfer assembly.

In order to accommodate such bi-axis movement, horizontal section 220 is mounted atop a rail assembly, 230, as revealed in FIG. 20, which includes rail and support. Disposed between section 220 and rail assembly 230 is a turntable assembly, 215, that includes a turntable mounted atop a linear bearing, 229. Such rail mount assembly permits joint assembly 224 to move along the longitudinal extent of rear bogey 214 as it crabs, rides over uneven terrain, etc. Such design also permits yaw axis movement by virtue of the turntable disposed atop the linear bearing structure in turntable assembly 215. Linear bearing 229 permits section 220 to rotate about rail 230. Finally, improved filing of grain bin 28 with grain can be achieved by a number of techniques, such as, for example, disposing slots (such as, for example, elongated slots, 233a and 233b, which may be, for example, about 4"×12") on the sides of section 220, having section 220 terminate with more than one end discharge chute, and like multiple discharge points.

Referring again to FIGS. 16-18, a different embodiment of the clean grain unloading assembly, 232, is shown in its stowed position (FIG. 16), in a left unloading position (FIG. 17), and in a right unloading position (FIG. 18). In particular, unloading assembly 232 is composed of a pair of chutes, 234 and 236, that fold/unfold about a pivot bracket, 238. A hood, 240, terminates chute 236. Chutes 234 and 236 are moved from a stowed position to an unloading position with the aid of hydraulic cylinders, 242 and 244. Cylinder 242 works through a bell crank arm assembly, 246, so that it will not go past center and lock up. A locking mechanism also can be added in the unloading position so that hydraulic pressure alone is not responsible to support distal chute 236.

The second important difference between the forward bogey of FIGS. 1-13 and 14-27 is the length of forward bogey 212. Designers of conventional combines are always dealing with the need for bigger grain tanks, axle weight distribution, and the addition of 20,000 pounds of grain as the tank fills. Also, as cornheads get wider, they get heavier and are approaching 10,000 pounds in weight. Therefor, total weight on the front axle becomes one of the biggest constraints in conventional combine designs. Engineers have combated this problem by positioning the front axle as far forward as possible; thus, shifting more weight to the rear axle. The rear axle has the built in weight carrying limitation that it must turn and provide all the steering.

A direct result of this axle design is that the cleaning fan, which is approximately 24 inches in diameter by 54 inches long, must be placed behind the front axle and behind the transmission. The transmission is a 4-speed gearbox with differential whose input is from the propulsion hydraulic motor and its outputs go to final drive single reduction gearboxes tucked into the drive wheels. The transmission is hung off the back of the front axle at its centerline.

These constraints and location of major components dictate where the grain cleaning process can start along the longitudinal axis, since it is must be to the rear of the cleaning fan in a conventional design. This adds approximately 48 inches to the length of the combine, which provides no useful function.

Since the disclosed design has no grain tank on the front module, the forward axle can be moved towards the rear and still make it a wheel-to-wheel spanning axle, as opposed to stub axles and a spanning frame. A cleaning fan, 211 (see FIG. 14), can be moved to the front side of the forward axle with its output duct, 213, passing under the front axle directly into the cleaning sieves. The conventional cleaning section can be moved forward, such that all grain coming through the threshing section concaves immediately and starts to be cleaned by the sieves. This design eliminates the 4 feet of nonessential combine length. This extra, viz. 4 feet, now is taken up by a group of augers or a stepped oscillating pan which moves the threshed material and grain rearward to the cleaning section sieves.

The transmission now can be mounted either in front of or in back of the forward axle and offset to one side of the machine centerline to allow easier passage of the cleaning fan duct. Such design is depicted in FIGS. 14-27, where the articulation cylinders are omitted for convenience. In particular, FIG. 16 illustrates a hydraulic drive motor, 235, mounted behind a stiff axle, 239, and connected to a final drive, 237. Such design of a drive motor and transmission mounted behind an axle can be used for each of the 4 wheel assemblies on the front and rear bogies, combinations of such wheel assemblies, or on each wheel pair. A direct consequence of a shorter forward bogey or module is a much shorter turning radius, as can be seen in FIGS. 22 and 23, where angle $\alpha$ is about 38°. Note should be taken of the chamfering of the rear of the forward bogey to accommodate the forward section of the rear bogey as the turn is made. It should be further noted that the rear bogey also could carry an internal combustion or other engine for running the hydraulics.

Figure 21:
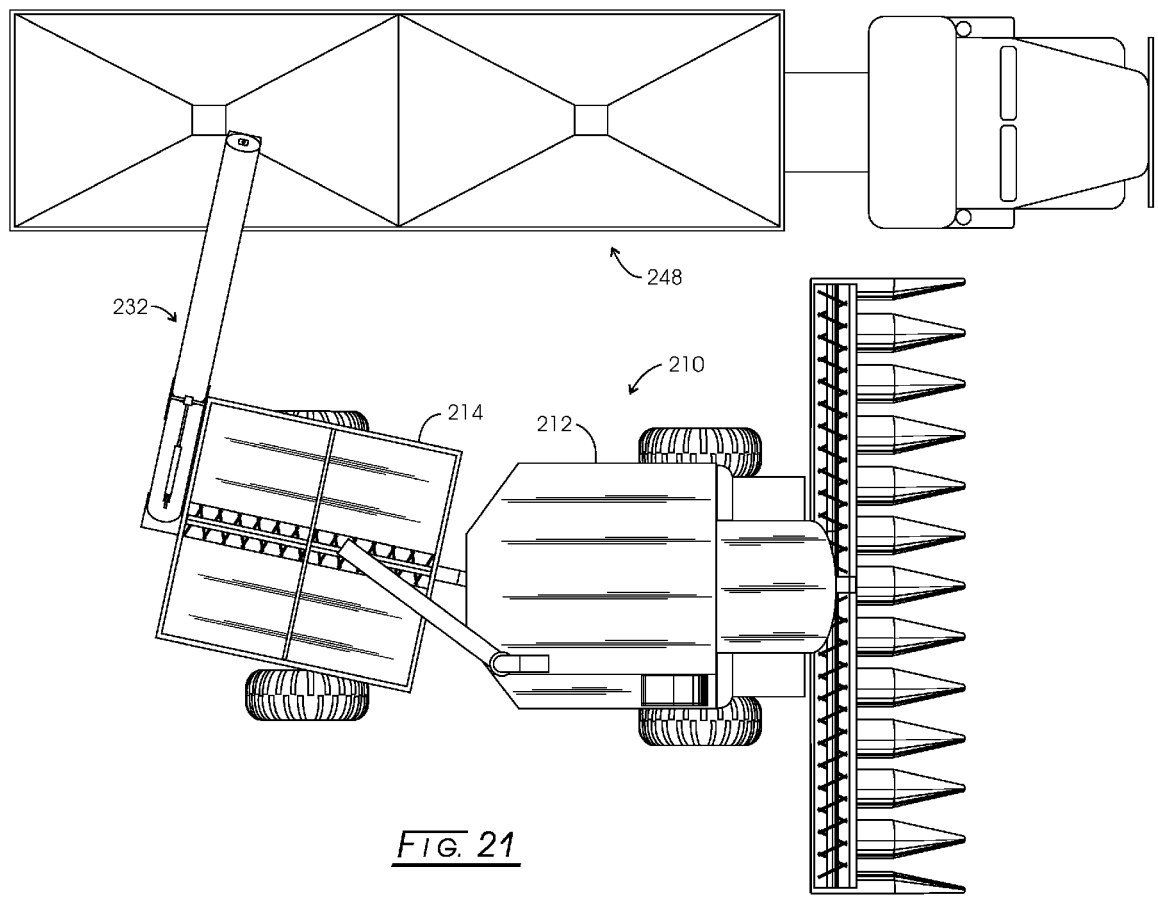
FIG. 21 is an overhead view of the harvester of FIG. 15 with the rear bogey crabbed and the grain loading assembly in an extended (active) unloading position for off-loading grain into a semi-truck hauler.
Figure 22:
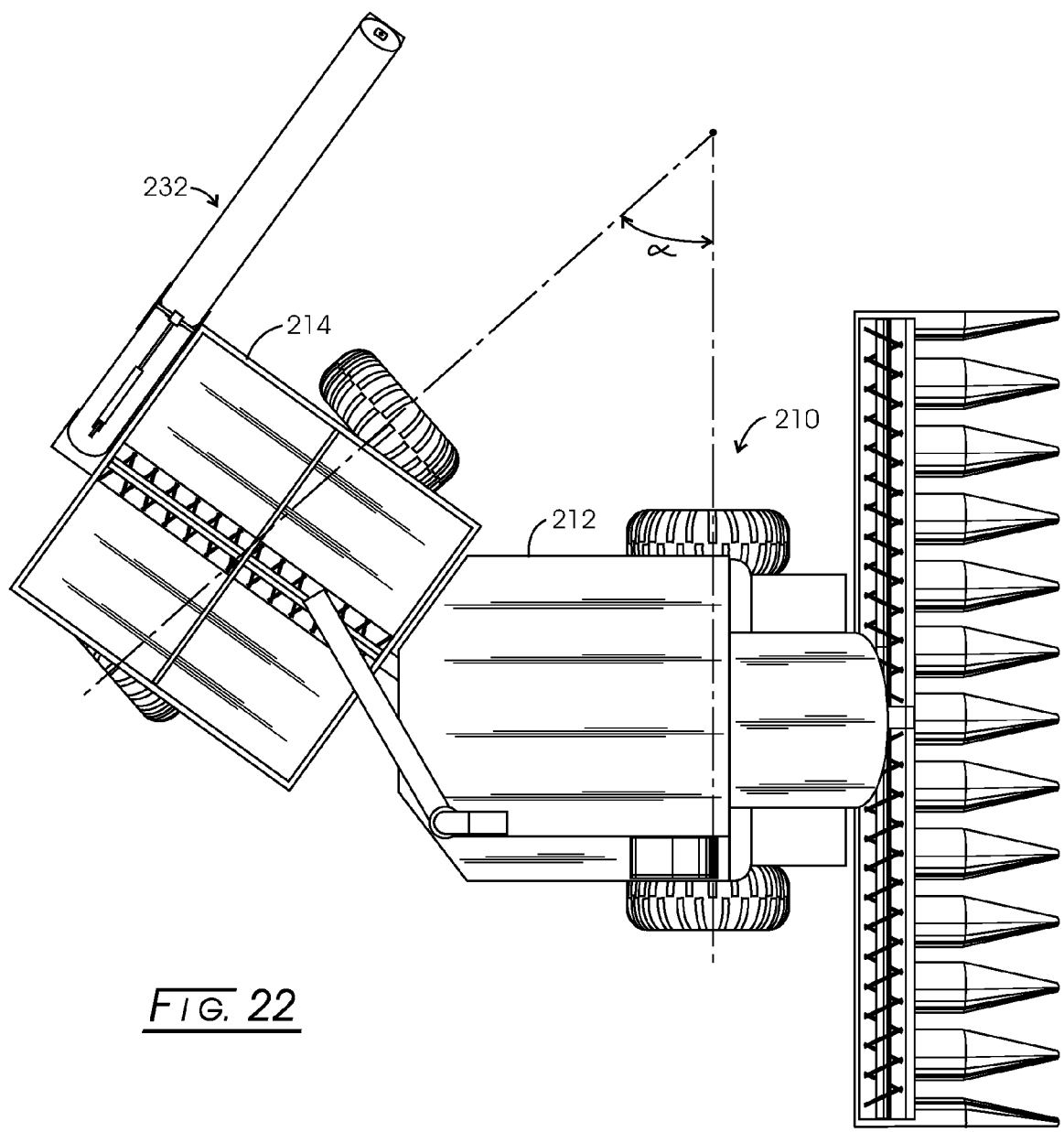
FIG. 22 is an overhead view of the harvester of FIG. 14 illustrating the decreased turning radius that the new forward bogey provides.
Figure 23:
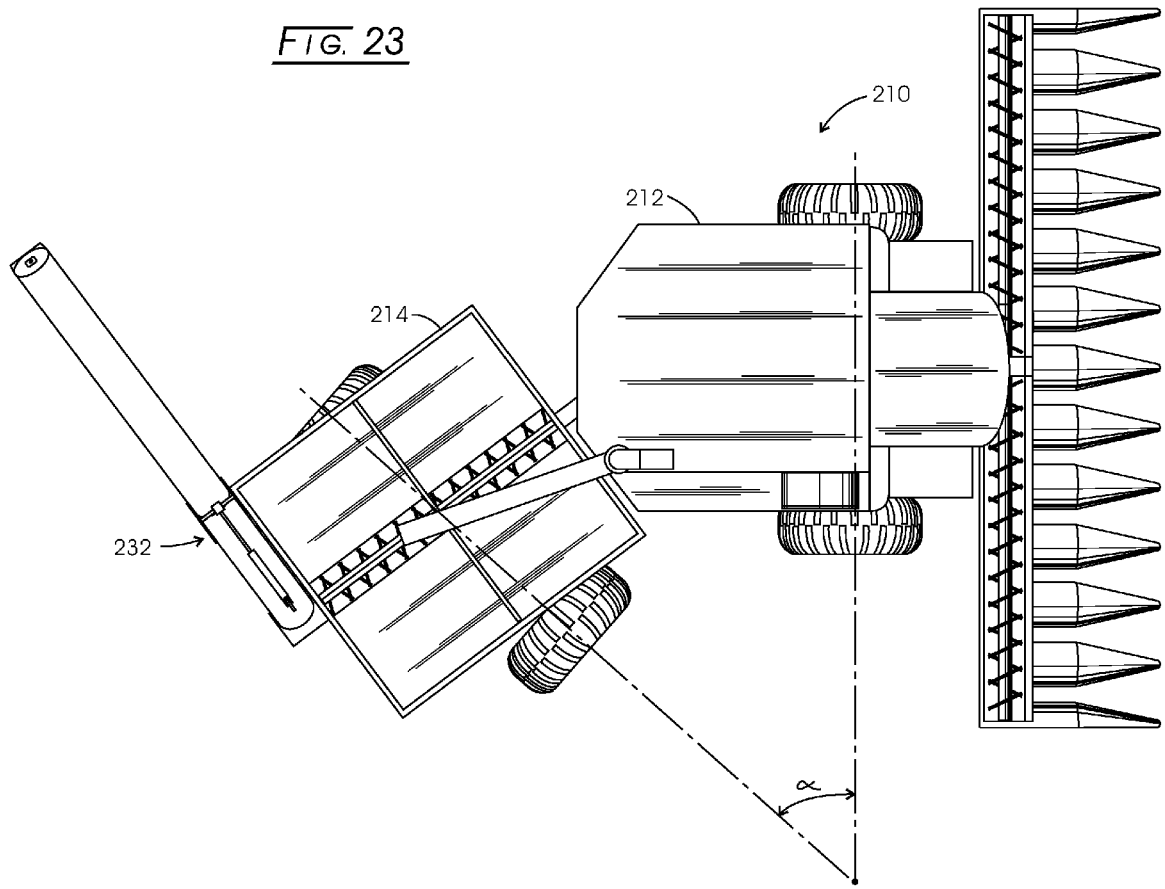
FIG. 23 is like FIG. 22 with the rear bogey crabbed in the other direction.
Figure 24:
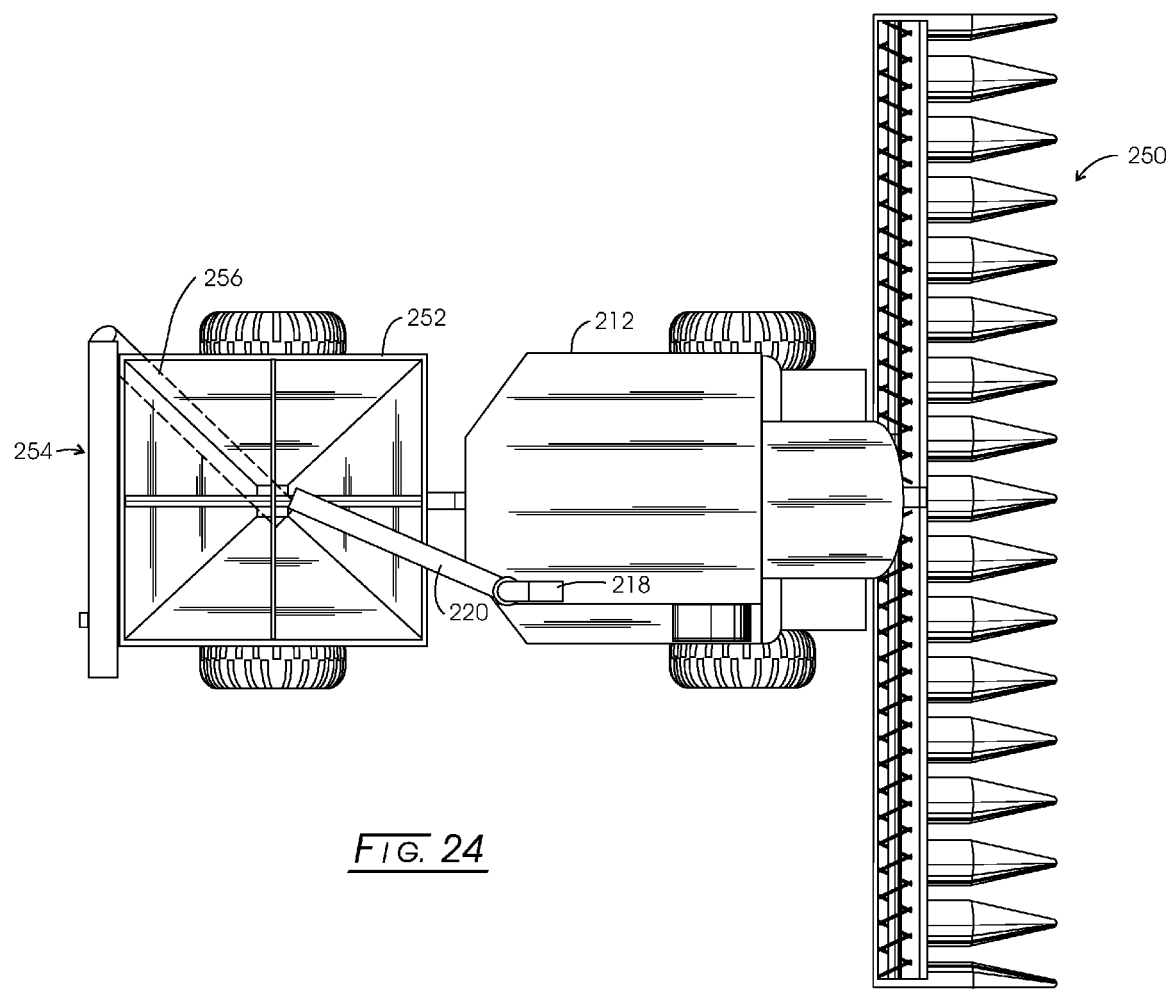
FIG. 24 is the harvester of FIG. 14 with the forward bogey fitted with a 16-row, 40 foot head and fitted with a corner-mounted grain unloading assembly.

FIG. 21 depicts grain unloading according to the design in FIGS. 14-23. In particular, a semi-truck, 248, is stationed adjacent to harvester 210. Rear bogey 214 has been crabbed slightly towards semi 248 and grain unloader 232 has been unfurled to an unload position towards semi 248. Unloading can take place while harvester 210 is stationary or moving forward while harvesting.

Figure 25:
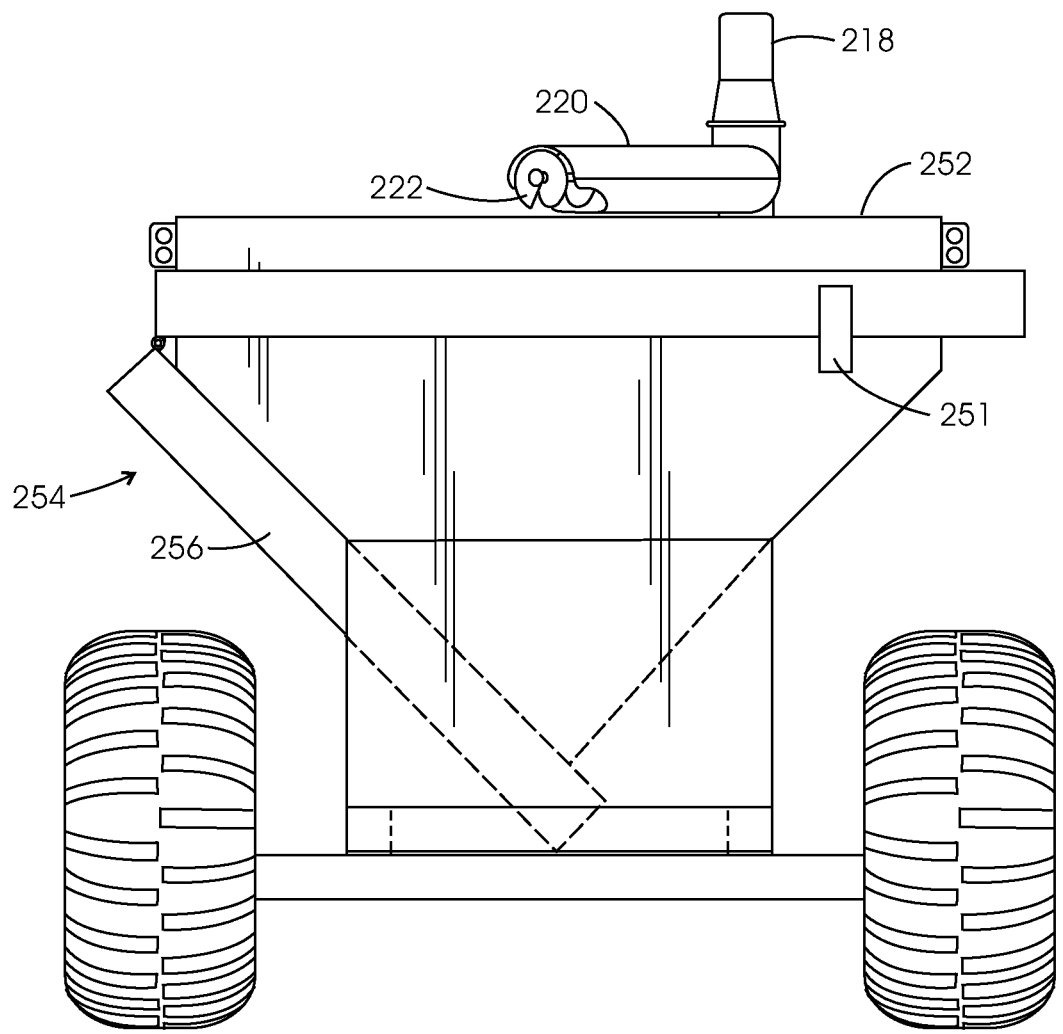
FIG. 25 is a rear view of the rear unit (bogey) of the harvester depicted in FIG. 14 with the grain unloading assembly in a storage (inactive) position and showing more detail of the alternative grain transfer assembly.

Referring now to FIGS. 24-27, it is noteworthy that a 16-row, 40-foot cornhead, 250, is shown being carried by forward bogey 212. Unloading issues are created by this and even wider cornheads and grainheads, as will be discussed below. Also shown, is an alternative rearward grain bogey, 252, which has 4 inwardly sloping sides (see FIG. 25) for gravity feeding of grain to a rear corner mounted grain transfer chute, 256, which is the first of two chutes that comprise a grain unloading assembly, 254. Also seen in FIG. 25, is a saddle, 251, for retaining the distal chute of grain unloader 254 when in a storage position.

Figure 26:
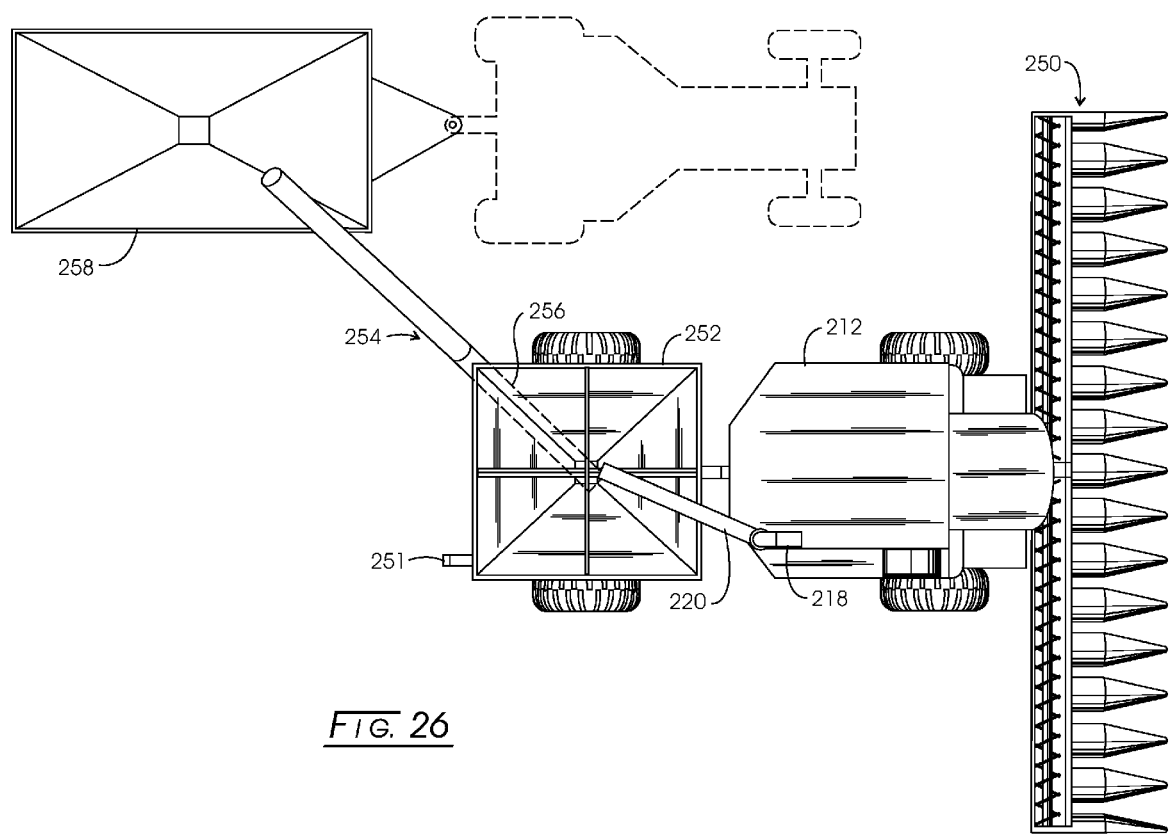
FIG. 26 is the harvester of FIG. 24 having the unloading assembly in an extended, unloading position and showing the grain hauler positioned behind the 16-row head and still receiving off-loading grain.

As seen in FIG. 26, a tractor pulled grain cart, 258, can be filled with grain from rear bogey 252 using unloading assembly 254 in an extended (unloading) position. The tractor is shown in phantom stationed behind grainhead 250, which extends a great distance to the side of the harvester. No crabbing of rear bogey 252 is needed. Were grain unloading initiated from the forward bogey, it would be very difficult, if not impossible, to pull the tractor/grain cart along side the combine for unloading. With grainheads approaching 60 feet in overall width, the advantage for grain unloading from the rear of rear bogey 252 becomes even more important.

Figure 27:
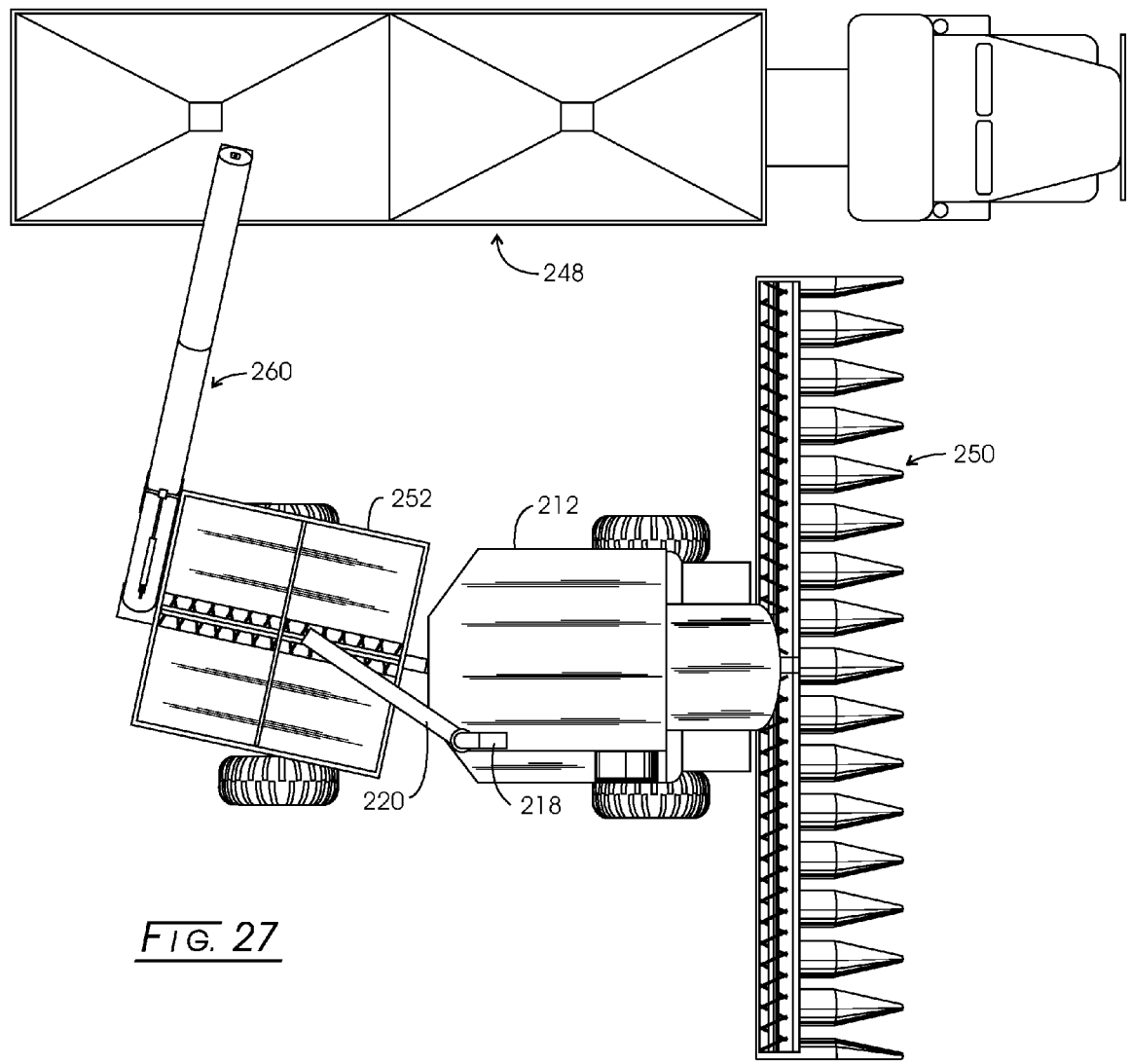
FIG. 27 is the harvester of FIG. 24 having a 3-segment unloading assembly in an extended, unloading position and showing the grain hauler positioned adjacent to the 16-row head and still receiving off-loading grain.

In FIG. 27, semi-truck 248 is pulled alongside 40-foot grainhead 250 and rear bogey 252 is crabbed towards the semi. Also, a tri-fold grain unloading assembly, 260, is used to off-load grain. The number of foldable sections provided for the grain unloading assembly is immaterial and is within the purview of the harvester designer.

The front and rear module ground drive systems can be symmetrical with respect to tire size, tire centerline, transmissions, hydrostatic drive motors, and pumps. The separate pumps can be cross-ported on their outputs to insure load sharing between the two systems. The two transmissions will be shifted simultaneously by a positive system, which can be air, hydraulic, or electrically powered. The advantage of two transmissions, two differentials, and a two-drive motor system, is that the two hydrostatic systems are available over the entire vehicle speed range and are always operating at their highest possible efficiency regardless of vehicle speed.

Alternately, one of the axle's wheels could be driven by direct drive, wheel supporting motors with no final drive gearbox or by two motors driving into the final drive gearbox with no transmission and differential on that axle.

Hydraulic motors, valves, and related equipment can be used to actuate the cylinder assemblies. It should be appreciated also that some and/or all of the hydraulic motors, valves, pumps, and the like, can be replaced by pneumatic motors and associated equipment, electric motors and associated equipment, or by any other power generating device or system, so long as the design and operation remains with the precepts of the present disclosure.

While the apparatus and system have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the US measurement system and all amounts and percentages are by weight, unless otherwise expressly indicated. Also, all citations referred herein are expressly incorporated herein by reference.

I claim:
1. An articulated harvester, which comprises:
   (a) a forward bogey having a front and a back, an operator's cab, an engine, a grain harvesting assembly located at the front of said forward bogey, a grain transfer assembly located at the back of said forward bogey, a grain separating and cleaning assembly located entirely behind said forward bogey axle, and a centerline running from back to front, said forward bogey being devoid of an on-board grain bin; and
   (b) a rearward bogey attached by a joint to said forward bogey and having a powered wheel assembly, an on-board grain bin for receiving grain from said forward bogey grain transfer assembly, and a grain off-loading assembly,
   the improvement for said articulated harvester to have a shorter turning radius which comprises:
   (c) said grain separating and cleaning assembly comprising:
      (1) a grain cleaning fan that is located entirely in front of the forward bogey axle and offset from the forward bogey centerline;
      (2) a plurality of grain cleaning sieves located entirely behind the forward bogey axle; and
      (3) a grain cleaning fan output duct operatively connecting the grain cleaning fan and the plurality of grain cleaning sieves; and
   (d) said forward bogey having a transmission that is located ahead of or behind said forward bogey axle and offset laterally opposite of said grain cleaning fan relative to the forward bogey centerline.

* * * * *